United States Patent
Pi et al.

(10) Patent No.: US 9,585,182 B2
(45) Date of Patent: Feb. 28, 2017

(54) DEVICE-TO-DEVICE COMMUNICATIONS BASED ON CAPACITIVE SENSING AND COUPLING VIA HUMAN BODY OR DIRECT DEVICE-TO-DEVICE COUPLING

(71) Applicant: Shenzhen Huiding Technology Co., Ltd., Shenzhen (CN)

(72) Inventors: Bo Pi, Carlsbad, CA (US); Xinhua Yu, San Jose, CA (US)

(73) Assignee: Shenzhen Huiding Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/977,492

(22) Filed: Dec. 21, 2015

(65) Prior Publication Data

US 2016/0113051 A1    Apr. 21, 2016

Related U.S. Application Data

(63) Continuation of application No. 14/659,259, filed on Mar. 16, 2015, now Pat. No. 9,218,099, which is a
(Continued)

(51) Int. Cl.
*G06F 3/041* (2006.01)
*H04W 76/02* (2009.01)
(Continued)

(52) U.S. Cl.
CPC .......... *H04W 76/023* (2013.01); *G06F 3/044* (2013.01); *G06F 3/0412* (2013.01); *G08C 17/06* (2013.01); *H04W 4/008* (2013.01)

(58) Field of Classification Search
CPC ........ G06F 3/044; G06F 3/041; G06F 3/0488; H04W 76/02; H04W 4/00
See application file for complete search history.

(56) References Cited

U.S. PATENT DOCUMENTS

| 4,542,291 A | 9/1985 | Zimmerman |
|---|---|---|
| 4,937,444 A | 6/1990 | Zimmerman |

(Continued)

FOREIGN PATENT DOCUMENTS

| CN | 101146293 A | 3/2008 |
|---|---|---|
| CN | 102347806 A | 2/2012 |

(Continued)

OTHER PUBLICATIONS

International Search Report and Written Opinion mailed on Sep. 30, 2014 for International Application No. PCT/IB2013/003229, filed Dec. 26, 2013 (11 pages).
(Continued)

*Primary Examiner* — Abbas Abdulselam
(74) *Attorney, Agent, or Firm* — Perkins Coie LLP

(57) ABSTRACT

Systems, devices and techniques disclosed in this document provide device-to-device communications via a human body of a user between (1) a capacitor sensor touch screen device that includes a capacitor sensor touch screen that includes capacitor sensors and provides a display function and (2) a capacitor sensor device that includes one or more capacitor sensors that detect or sense, based on capacitive sensing and without providing a display function, signals transmitted from the capacitor sensor touch screen of the capacitor sensor touch screen device. The human body of a user operates as a signal transmitting medium. In addition, the systems, devices and techniques disclosed in this document provide device-to-device communications via direct device-to-device coupling between two capacitor sensor touch screen devices each including capacitor sensor touch screen that includes capacitor sensors and provides a display function.

17 Claims, 15 Drawing Sheets

Related U.S. Application Data continuation of application No. 13/794,697, filed on Mar. 11, 2013, now Pat. No. 8,982,094.

(60) Provisional application No. 61/747,174, filed on Dec. 28, 2012.

(51) Int. Cl.
  *G08C 17/06* (2006.01)
  *G06F 3/044* (2006.01)
  *H04W 4/00* (2009.01)

(56) References Cited

U.S. PATENT DOCUMENTS

| | | | |
|---|---|---|---|
| 4,988,981 A | 1/1991 | Zimmerman et al. | |
| 5,097,252 A | 3/1992 | Harvill et al. | |
| 5,103,085 A | 4/1992 | Zimmerman | |
| 5,287,789 A | 2/1994 | Zimmerman | |
| 5,488,196 A | 1/1996 | Zimmerman et al. | |
| 5,563,358 A | 10/1996 | Zimmerman | |
| 5,796,827 A | 8/1998 | Coppersmith et al. | |
| 5,914,701 A | 6/1999 | Gersheneld et al. | |
| 6,184,865 B1 | 2/2001 | Zimmerman et al. | |
| 6,424,334 B1 | 7/2002 | Zimmerman et al. | |
| 6,437,772 B1 | 8/2002 | Zimmerman et al. | |
| 6,542,304 B2 | 4/2003 | Tacklind et al. | |
| 6,657,788 B2 | 12/2003 | Tacklind et al. | |
| 6,848,188 B2 | 2/2005 | Tacklind et al. | |
| 7,205,979 B2 | 4/2007 | Zimmerman et al. | |
| 7,330,662 B2 | 2/2008 | Zimmerman | |
| 7,633,493 B2 | 12/2009 | Syeda-Mahmood et al. | |
| RE41,731 E | 9/2010 | Dietz et al. | |
| 7,868,759 B2 | 1/2011 | Zimmerman | |
| 7,995,802 B2 | 8/2011 | Hu et al. | |
| 8,027,083 B2 | 9/2011 | Smith et al. | |
| 8,643,625 B2 | 2/2014 | Kruglick | |
| 9,218,099 B2 * | 12/2015 | Pi | G08C 17/06 |
| 2008/0062146 A1 | 3/2008 | Lee | |
| 2012/0026129 A1 | 2/2012 | Kawakami | |
| 2013/0048718 A1 | 2/2013 | Tessier | |
| 2014/0199944 A1 | 7/2014 | Ran et al. | |

FOREIGN PATENT DOCUMENTS

| | | |
|---|---|---|
| CN | 102725717 A | 10/2012 |
| CN | 102916729 A | 2/2013 |
| CN | 103207717 A | 7/2013 |
| EP | 0 838 776 B1 | 8/2006 |
| WO | 96/36134 A1 | 11/1996 |
| WO | 02/17222 A2 | 2/2002 |
| WO | 03/015224 A2 | 2/2003 |

OTHER PUBLICATIONS

Zimmerman, T.G., "Personal Area Networks: Near-field Intrabody Communication," IBM Systems Journal, 35(3-4):609-617, 1996.

* cited by examiner

Shoe implementation of sensor and HBN devices. Two position options of the capacitive coupling conductors, one in the sole, one in the bottom of shoe and with embedded electronics and sensor.

DEVICE-TO-DEVICE COMMUNICATIONS BASED ON CAPACITIVE SENSING AND COUPLING VIA HUMAN BODY OR DIRECT DEVICE-TO-DEVICE COUPLING

CROSS REFERENCE TO RELATED APPLICATIONS

This patent document is a continuation of and claims priority to and benefits of U.S. patent application Ser. No. 14/659,259, filed on Mar. 16, 2015, which is a continuation of U.S. patent application Ser. No. 13/794,697, filed on Mar. 11, 2013, now U.S. Pat. No. 8,982,094, which claims the benefit of priority of U.S. Provisional Patent Application No. 61/747,174, filed on Dec. 28, 2012. The entire content of the before-mentioned patent applications is incorporated by reference as part of the disclosure of this application.

BACKGROUND

This patent document relates to techniques, devices and systems for exchanging information and establishing communications between two or more communication devices via capacitive coupling.

A capacitive sensor is a sensing device based on one or more capacitors which are coupled to a sensor circuit that applies an electrical signal to the one or more capacitors and measures the variation of signal due to a change that occurs at the one or more capacitors. This change can reflect one or more variations that affect the operation of the one or more capacitors, e.g., a change in relative spacing between two electrodes of a capacitor, a change in the relative position or overlap between two electrodes of a capacitor, a change in the dielectric material that affects the capacitance of a capacitor or a change in the electric field that affects the capacitance of a capacitor. Capacitor sensors can be configured to measure various parameters, such as motion, material composition, touch, object proximity, pressure, acceleration, and so on.

Some computers and communication devices use touch screens based on a 2-dimensional array of capacitor sensors to allow users to interact with the computers or devices by touching the touch screens. Various mobile phones and portable devices such as tablets use capacitor sensor touch screens to provide user friendly and intuitive user I/O interfaces for operating the mobile phones and portable devices.

SUMMARY

The systems, devices and techniques disclosed in this document provide device-to-device communications via a human body of a user between (1) a capacitor sensor touch screen device that includes a capacitor sensor touch screen that includes capacitor sensors and provides a display function and (2) a capacitor sensor device that includes one or more capacitor sensors that detect or sense, based on capacitive sensing and without providing a display function, signals transmitted from the capacitor sensor touch screen of the capacitor sensor touch screen device. The human body of a user operates as a signal transmitting medium between the capacitor sensor touch screen device capacitor sensor device without a display function to transmit signals between the two devices in communications.

In addition, the systems, devices and techniques disclosed in this document provide device-to-device communications via a human body of a user or direct device-to-device coupling between two capacitor sensor touch screen devices each including capacitor sensor touch screen that includes capacitor sensors and provides a display function.

In one implementation, a method is disclosed to provide communications between a capacitor sensor touch screen device that includes a capacitor sensor touch screen with capacitor sensors and a capacitor sensor device that includes one or more capacitor sensors for capacitive sensing. This method includes placing the capacitor sensor device in capacitive coupling with the capacitor sensor touch screen device to enable electrical signaling between the capacitor sensor device and the capacitor sensor touch screen device; operating a first device of the capacitor sensor device and the capacitor sensor touch screen device to initiate a device-to-device connection initiation signal via the capacitive coupling to a second device of the capacitor sensor device and the capacitor sensor touch screen device; operating the second device to detect the device-to-device connection initiation signal via capacitive coupling and, in response, to generate an acknowledgement to the device-to-device connection initiation signal to the first device; operating the first device to receive the acknowledgement from the second device and, upon receiving the acknowledgment from the second device, operating the first device to (1) send the second device an acknowledgment back signal and (2) turn the first device into a connect state for device-to-device communications with the second device; and operating the second device to (1) detect the acknowledgment back signal from the capacitor sensor touch screen device and, (2) upon receiving the acknowledgment back signal from the first device, set the second device into a connect state for device-to-device communications with the first device, thus enabling device-to-device communications between the first device and the second device via the capacitive coupling. In the above method, one of the following uses can be provided: the capacitor sensor touch screen device is a smart phone or tablet computer and the capacitor sensor device is a sensor device without a display function; the capacitor sensor touch screen device is a smart phone or tablet computer and the capacitor sensor device is a sensor device that includes a display panel that is not associated with or separated from the one or more capacitor sensors for capacitive sensing; and the capacitor sensor touch screen device is a smart phone or tablet computer and the capacitor sensor device is a second smart phone or tablet computer.

Various features and implementations are described in greater detail in the drawings, the description and the claims.

DETAILED DESCRIPTION

A capacitive touch panel or capacitor sensor touch screen can be used to provide a user input/output/(I/O) interface and a display panel in various electronic or communication devices such as mobile phones including smart phones, tablet computers, electronic readers, portable computers, laptop computers, desktop computers and other electronic devices. Low frequency electrical signals from a capacitive touch panel or capacitor sensor touch screen can be coupled to a human body, and another device that is attached to, in contact with, or in the proximity of the human body to be capacitively coupled to the human body can pick up such signals. This mechanism can be used to provide device-to-device communications via the human body, e.g., using a capacitive touch panel of a smart phone to transmit data and another device to detect the data sent from the smart phone or conversely, using the smart phone to receive data or information from the other device.

Figure 1A:
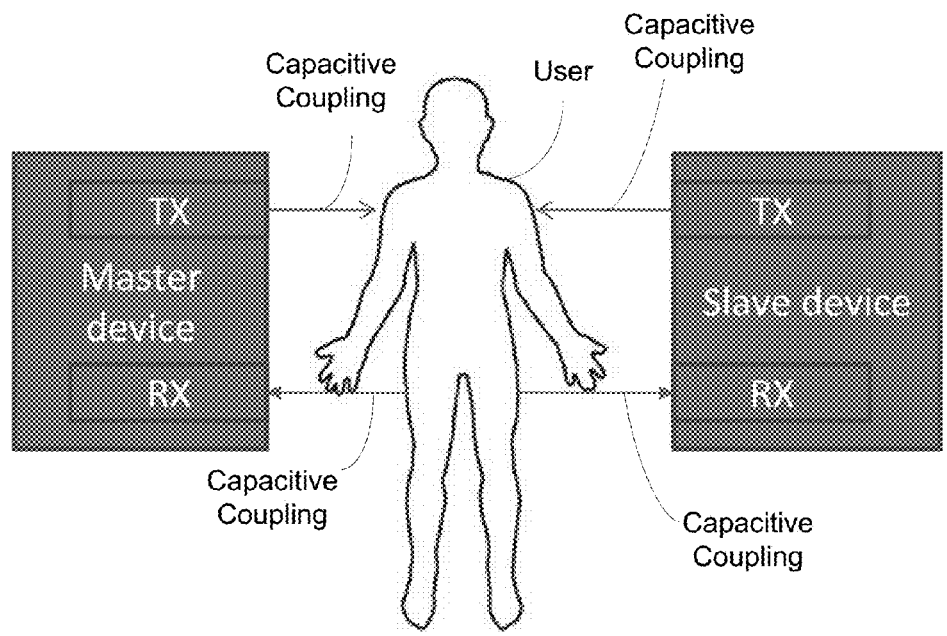
FIG. 1A shows an example of a device-to-device communication system via a user's body between a master device and a slave device.

FIG. 1A shows an example of a device-to-device communication system via a user's body between a master device and a slave device. In this particular example, each device is a capacitive sensor transceiver that includes a transmitter (TX) for sending a signal via capacitive coupling with the human body and a receiver (RX) that receives a signal from the other device via capacitive coupling with the human body. In some applications, one of the devices, e.g., the slave device, can be a transmitter-only device that transmits certain information or data, e.g., a sensor signal from a sensor in the slave device, to the master device which may be a receiver-only device in some applications and may be a transceiver device in other applications. The master device in FIG. 1A is a capacitor sensor touch screen device that includes a capacitor sensor touch screen having capacitor sensors to provide a display function for displaying information to a user, a touch panel user I/O interface for the user to operate and interact with the master device, and a device-to-device communication interface for detecting or sensing a device-to-device communication signal from the slave device and, in some implementations, for sending a device-to-device communication signal to the slave device. The slave device in FIG. 1A is a capacitor sensor device that includes one or more capacitor sensors that detect or sense, based on capacitive sensing and without providing a display function, signals transmitted from the capacitor sensor touch screen of the capacitor sensor touch screen device. In some implementations, the slave device FIG. 1A, although having one or more capacitor sensors capable of transmitting or receiving capacitive coupled device-to-device communication signaling, can be a lesser device in some aspect than the master device. For example, the slave device may not have a display function to display information to a user while the master device has a fully functional display such as a touch screen as in various smartphones or tablet computers.

Figure 1B:
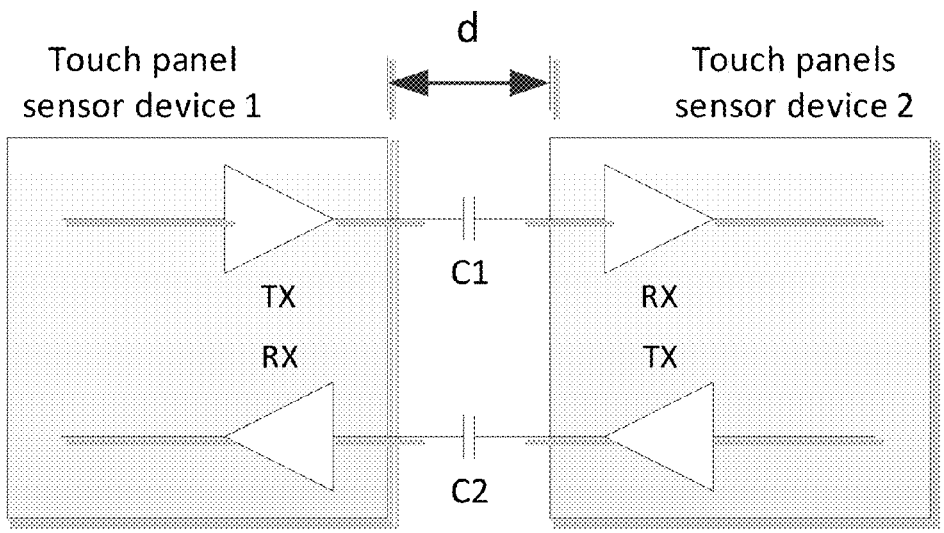
FIG. 1B shows a specific example of the master device in FIG. 1A as a touch panel sensor device 1 with transmitter (TX) and receiver (RX) functions via a touch panel for capacitive coupling and with a display function and the slave device in FIG. 1A as a touch panel sensor device 2 with TX and RX functions via its own touch panel for capacitive coupling without a display function.

FIG. 1B shows a specific example of the master device in FIG. 1A as a touch panel sensor device 1 with TX and RX functions via a touch panel for capacitive coupling and with a display function and the slave device in FIG. 1A as a touch panel sensor device 2 with TX and RX functions via its own touch panel for capacitive coupling without a display function. The capacitive coupling for transmitting a signal from the master to the slave is represented by an effective capacitance C1 and the capacitive coupling for transmitting a signal from the slave to the master is represented by an effective capacitance C2. The master device may be a smart phone with a capacitive touch panel, or a special capacitive coupling antenna. The slave device may be an electronics device attached to the body of a user such as a wrist watch or device, a sensor in shoe or a sensor attached to a belt worn by the user. The master device can be operated to send low frequency electrical signals (e.g., between a few kHz to a few hundreds of kHz) modulated with data information coupled to human body through capacitive coupling (TX). The slave device may have a receiving circuit connected to a capacitive coupled electrodes to receive the signals from master device. The slave device may include processing circuitry that demodulates and decodes the received data signals from the master. Conversely, the slave device can also send signals via capacitive coupling to the master device which demodulates and decodes the received signals from the slave device.

Figure 2A:
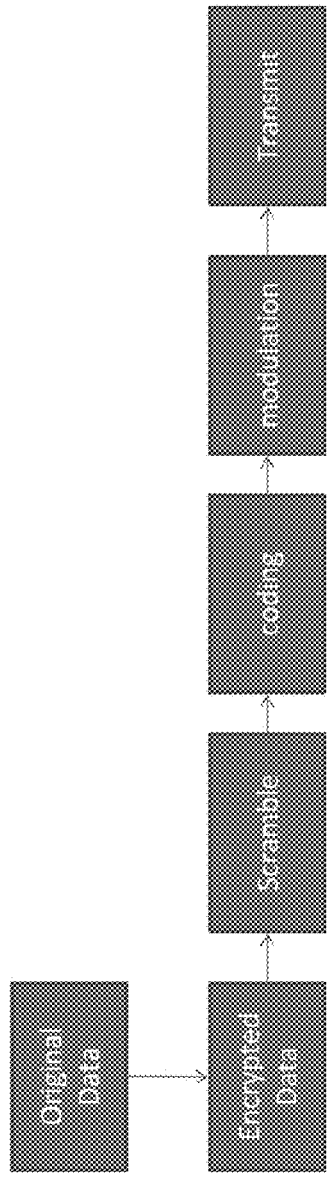
FIG. 2A shows an example of the signal chain for transmitting a device-to-device signal from a transmitter (TX) in either the master device or the slave device in FIG. 1A and FIG. 1B.

FIG. 2A shows an example of the signal chain for transmitting a device-to-device signal from a transmitter (TX) in either the master device or the slave device in FIG. 1A and FIG. 1B. In this example, the transmitter includes a data encryption module that encrypts the original data into encrypted data, a data scrambling module that scrambles the encrypted data, a data coding module that encodes the output data from the data scrambling module, a signal modulator that modulates the encoded data produced by the data coding module onto a low frequency signal carrier for transmission, and a signal transmitter module that transmits the modulated signal via the capacitor sensors or the touch screen panel.

Figure 2B:
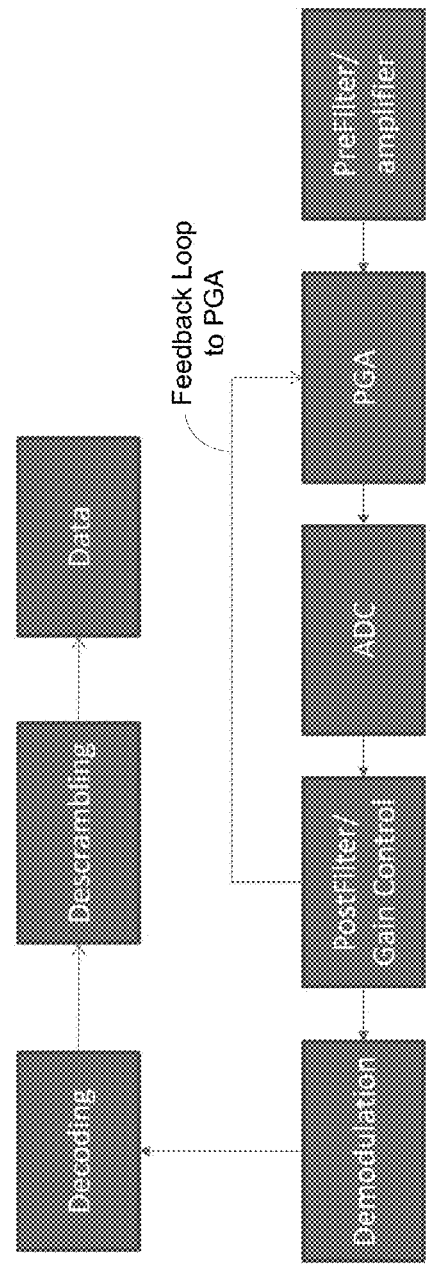
FIG. 2B shows an example of the signal chain for receiving a device-to-device signal by a receiver (RX) in either the master device or the slave device in FIG. 1A and FIG. 1B.

FIG. 2B shows an example of the signal chain for receiving a device-to-device signal by a receiver (RX) in either the master device or the slave device in FIG. 1A and FIG. 1B. In this example, the receiver includes a front receiver module having a pre filter and an amplifier for filtering and amplifying a received device-to-device communication signal, a programmable gain amplifier (PGA) module for preconditioning the output from the front receiver module for processing the analog-to-digital conversion (ADC) module, and a post-filter/gain control module coupled to receive the output of the ADC module with a feedback to the PGA module, a demodulation module that demodulates the output signal, a decoding module that decodes the demodulated signal produced by the demodulation module, and a descrambling module that descrambles the decoded output from the decoding module to produce the extracted data.

Notably, the device-to-device capacitive coupling communications can be implemented in ways that the device-to-device capacitive coupling communications function can share all or significant portion of the existing circuitry for the touch panels in smart phones and tablet computers. This use of the existing circuitry for the touch panels in smart phones and tablet computers allows the present device-to-device capacitive coupling communications to be added without significant increase in device real estate and complication of the device hardware. In comparison with some existing device-to-device communication methods (e.g., RF device to device communications under the Bluetooth and IR device to device communications), the present device-to-device capacitive coupling communications eliminate the need for completely separate hardware modules and can significantly reduce the power consumption of the device which is an important aspect of mobile electronic devices.

Referring back to FIGS. 1A and 1B, a mater device and a slave device can form an ad hoc device-to-device communication network via proper handshake communication protocol. Various ad hoc device-to-device communication protocols may be implemented.

Figure 3:
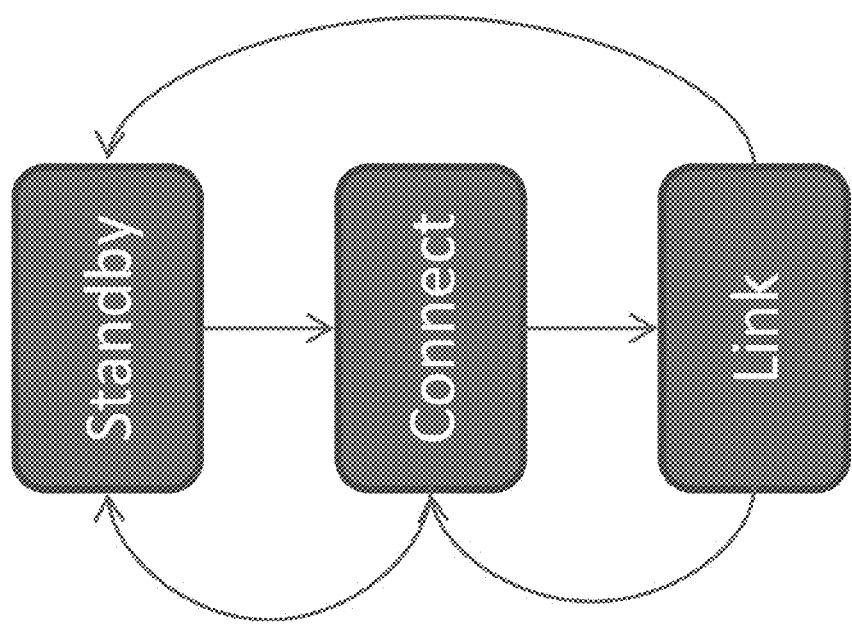
FIG. 3 shows an example of device-to-device communications for establishing such ad hoc device-to-device communications between the master device and the slave device.

FIG. 3 shows an example of device-to-device communications for establishing such ad hoc device-to-device communications between the master device and the slave device. Prior to establishing ad hoc device-to-device communications, each device (master or slave) is configured to include circuitry that operates the device in a standby mode capable of detecting signals from other devices for initiating ad hoc device-to-device communications. In this context, a device that initiates ad hoc device-to-device communications is a master device and sends out an initiation signal, e.g., a frequency periodic wave signal as a frequency modulation (FM) signal (e.g., a sine/cos wave signal, a triangular wave signal or square wave signal). A slave device detects this FM signal from the master device and, in response, sends the master device an acknowledgement signal with an ACK frame. Next, the master device detects the ACK frame and sends another acknowledgement signal (ACK) to the slave device. After sending this ACK signal to the slave device, the master device switches to a connected state with the slave device. On the slave device side, upon receiving and detecting the ACK from the master device, the slave device switches to a connected state with the master device. At this time, the master device and the slave device establish ad hoc device-to-device communications.

Figure 4:
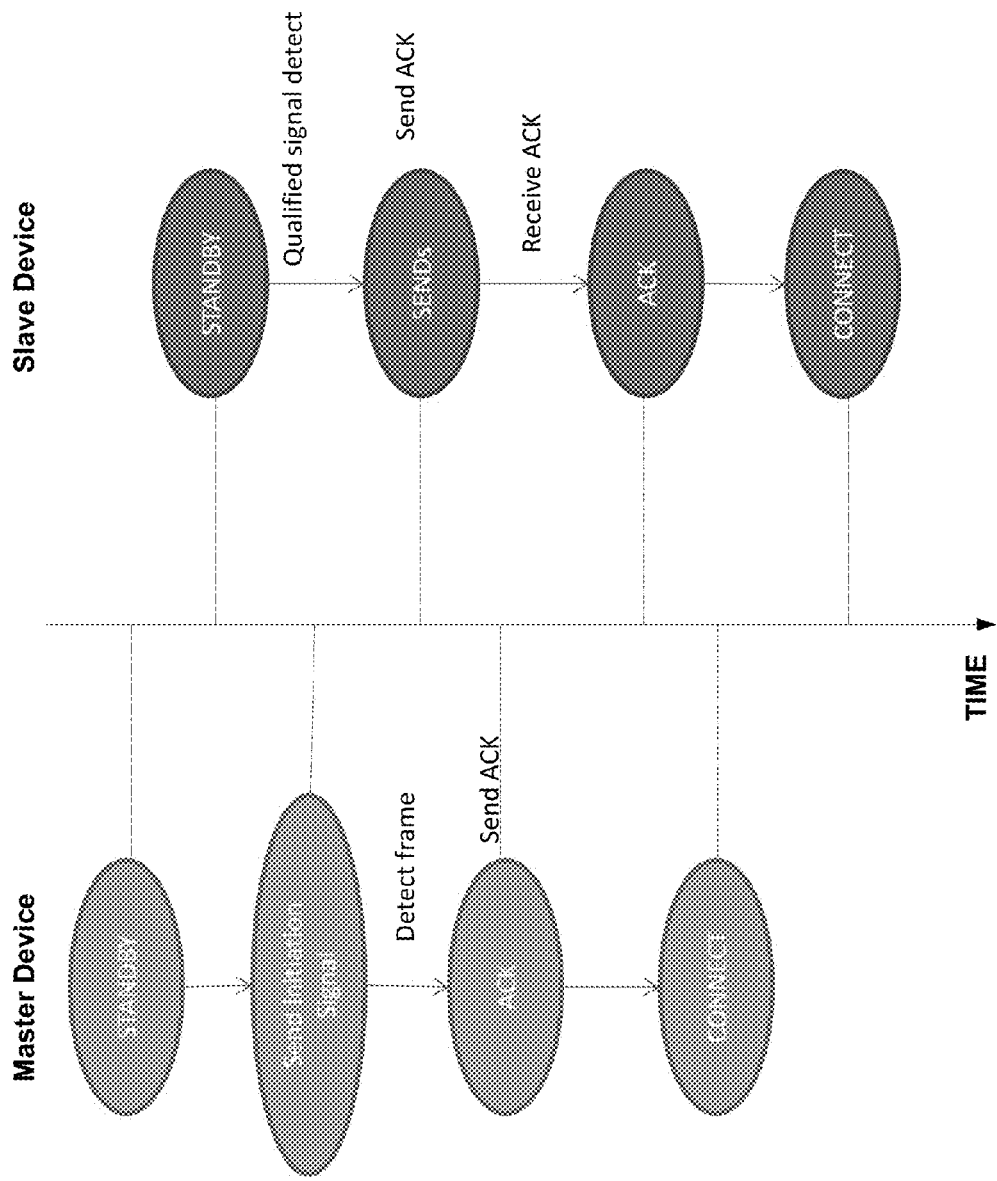
FIGS. 4 and 5 show some details of the sequence of operations by the master device and the slave device in the example in FIG. 3.
Figure 5:
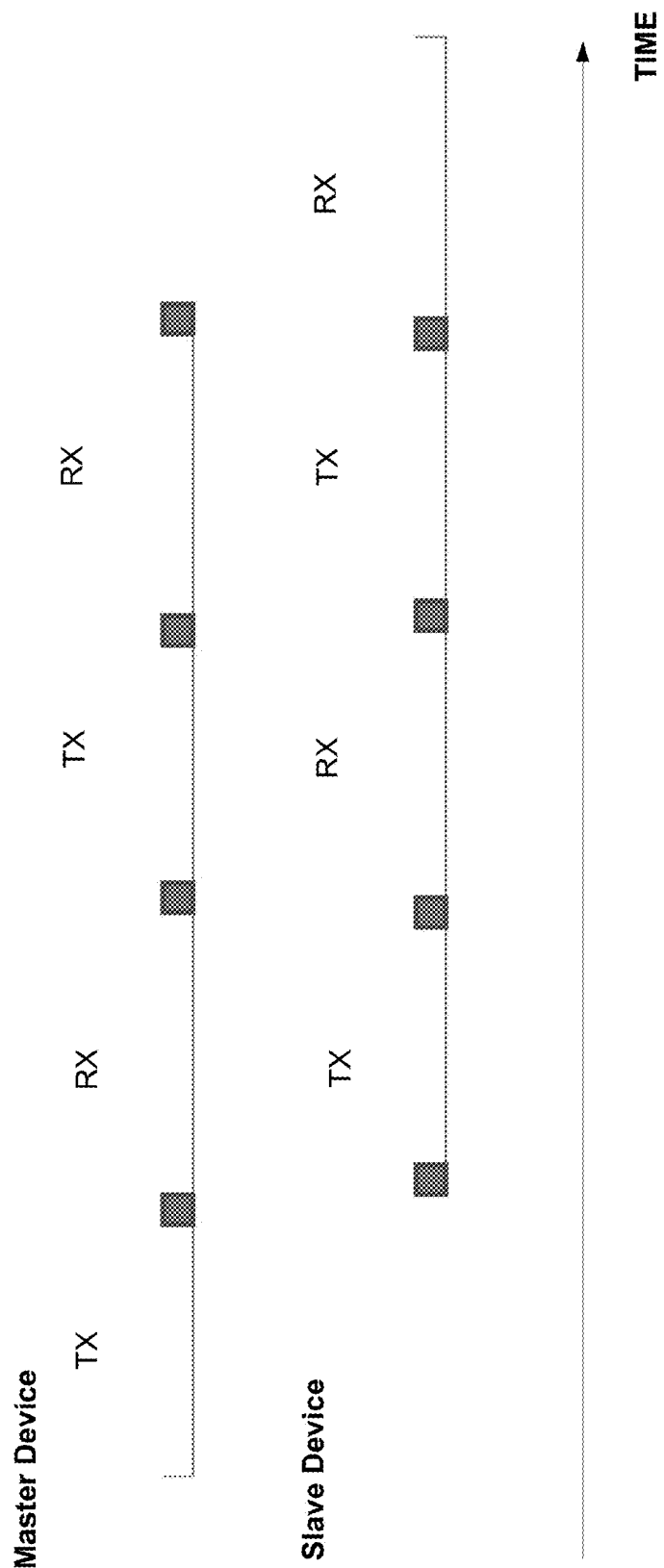

FIGS. 4 and 5 show some details of the sequence of operations by the master device and the slave device in the example in FIG. 3. FIG. 4 shows examples of some operating states of the master and slave devices and their relationships. FIG. 5 shows some examples of the time slots of actions by the master and slave devices, respectively. This time-division multiplexed communications may be implemented in various specific time allocations. For example, in some implementations, the master device may be allocated with a time slot of around 2 ms for sending out the initiation signal, a time slot of around 2 ms total for sending out the master ACK signal that includes a periodic wave signal in a time slot of around 1 ms and another time slot of around 1 ms for the master signal (e.g., PN11 signaling under IEEE 802.11b); and the slave device may be allocated with a time slot of around 2 ms for the slave ACK signal that includes a periodic wave signal in a time slot of around 1 ms and another time slot of around 1 ms for the slave PN11 signal.

Figure 6:
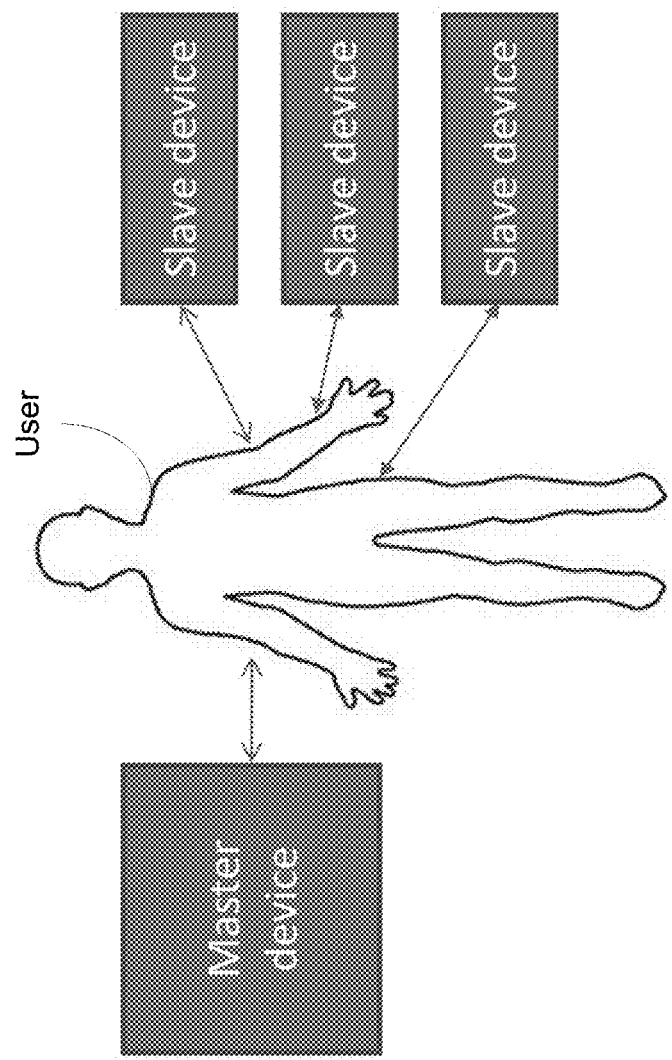
FIG. 6 shows that, in some applications, a master device may initiate ad hoc device-to-device communications with 2 or more slave devices that are attached to or in proximity of a user.

FIG. 6 shows that, in some applications, a master device may initiate ad hoc device-to-device communications with 2 or more slave devices that are attached to or in proximity of a user. In addition, a slave device may communicate with 2 or more master devices in some applications.

Based on the above, various implementations may be provided. The following examples are provided for ad hoc device-to-device communications between two devices where one of the devices does not have a display function. Devices without a display function can be a sensor device in some applications.

For example, a method can be implemented for providing communications between a capacitor sensor touch screen device that includes a capacitor sensor touch screen with capacitor sensors and a capacitor sensor device that includes one or more capacitor sensors for capacitive sensing without a display function and is attached to or in proximity of a human body of a user. This method can include operating the capacitor sensor device without a display function to detect a device-to-device connection initiation signal from the capacitor sensor touch screen device via capacitive coupling through the human body of the user and, in response, to generate an acknowledgement to the device-to-device connection initiation signal; operating the capacitor sensor device without a display function to detect an acknowledgment back signal generated by the capacitor sensor touch screen device after receiving the acknowledgment from the capacitor sensor device without a display function; and subsequently operating the capacitor sensor device without a display function in a device-to-device communication mode to send data via the one or more capacitor sensors to the capacitor sensor touch screen device without a display function.

For another example, a method can be implemented for providing communications between (1) a capacitor sensor touch screen device that includes a capacitor sensor touch screen that includes capacitor sensors and provides a display function and (2) a capacitor sensor device that includes one or more capacitor sensors that detect or sense, based on capacitive sensing and without providing a display function, signals transmitted from the capacitor sensor touch screen of the capacitor sensor touch screen device. This method includes placing the capacitor sensor device without a display function in proximity of, or in contact with, a body part of a user to be in capacitive coupling with the body part; operating the capacitor sensor touch screen device to (1) control the capacitor sensor touch screen to provide touch-based user interfacing between the user and the capacitor sensor touch screen device, and (2) operate the same capacitor sensor touch screen to sense a device-to-device communication signal from the capacitor sensor device without a display function to allow device-to-device signaling between the capacitor sensor touch screen device and the capacitor sensor device without a display function via capacitive coupling through the human body of the user; operating the capacitor sensor touch screen device to initiate a device-to-device connection initiation signal and to multiplex the device-to-device connection initiation signal in time with a touch screen signal that provides touch-based user interfacing between touching of the capacitor sensor touch screen by the user and the capacitor sensor touch screen device so as to direct the multiplexed signal to the capacitor sensor touch screen; operating the capacitor sensor touch screen to receive an acknowledgement to the device-to-device connection initiation signal in a device-to-device communication signal from the capacitor sensor device without a display function; when the acknowledgment is detected, operating the capacitor sensor touch screen device to send the capacitor sensor device without a display function an acknowledgment back signal that is multiplexed in time with a touch screen signal to the capacitor sensor touch screen; and subsequently operating the capacitor sensor touch screen device to use one or more time slots in a touch screen signal that are not used for touch-based user interfacing between touching of the capacitor sensor touch screen by the user and the capacitor sensor touch screen device to communicate with the capacitor sensor device without a display function.

For yet another example, a method can be implemented for providing communications between a capacitor sensor touch screen device that includes a capacitor sensor touch screen with capacitor sensors and a capacitor sensor device that includes one or more capacitor sensors for capacitive sensing without a display function. This method includes placing the capacitor sensor device without a display function in proximity of, or in contact with, a body part of a user to be in capacitive coupling with the body part; operating the capacitor sensor touch screen device to (1) control the capacitor sensor touch screen to provide touch-based user interfacing between the user and the capacitor sensor touch screen device, and (2) operate the same capacitor sensor touch screen to initiate a device-to-device connection initiation signal and to multiplex the device-to-device connection initiation signal in time with a touch screen signal that provides touch-based user interfacing between touching of the capacitor sensor touch screen by the user and the capacitor sensor touch screen device so as to direct the multiplexed signal to the capacitor sensor touch screen; operating the capacitor sensor device without a display function to detect the device-to-device connection initiation signal via capacitive coupling through the human body of the user and, in response, to generate an acknowledgement to the device-to-device connection initiation signal. This method operates the capacitor sensor touch screen of the capacitor sensor touch screen device to receive the acknowledgement from the capacitor sensor device without a display function. In addition, this method includes, when the acknowledgment is detected, operating the capacitor sensor touch screen device to send the capacitor sensor device without a display function an acknowledgment back signal that is multiplexed in time with a touch screen signal to the capacitor sensor touch screen; operating the capacitor sensor device without a display function to detect the acknowledgment back signal from the capacitor sensor touch screen device and, in response, to set the capacitor sensor device into a device-to-device communication mode to send data to the capacitor sensor touch screen device; and subsequently operating the capacitor sensor touch screen device to use one or more time slots in a touch screen signal that are not used for touch-based user interfacing between touching of the capacitor sensor touch screen by the user and the capacitor sensor touch screen device to communicate with the capacitor sensor device, including receiving the data from the capacitor sensor device without a display function.

Figure 7:
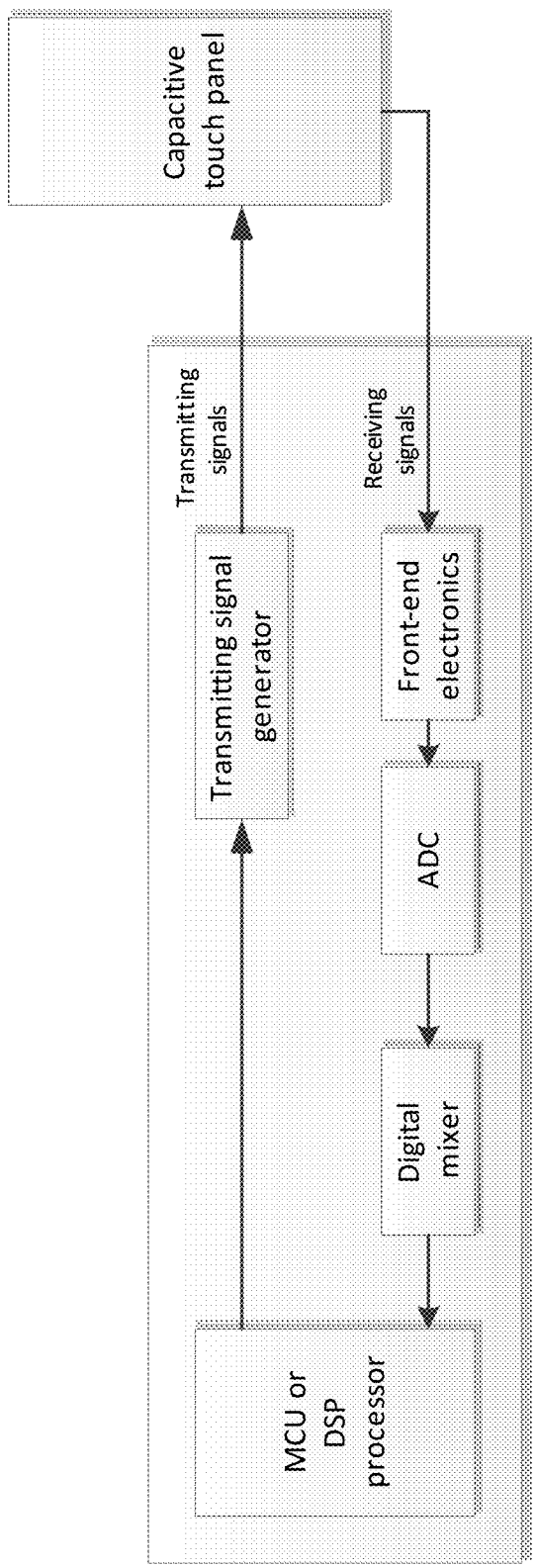
FIG. 7 shows an example of the circuitry layout of a master or slave device having a capacitive touch panel with capacitive sensors.

FIG. 7 shows an example of the circuitry layout of a master or slave device having a capacitive touch panel with capacitive sensors. Common to both RX and TX circuits in the master or slave device is a microcontroller (MCU) or a digital signal processing (DSP) circuit block that both generates the output signals to a transmission signal generator circuitry coupled to the capacitive touch panel and processes received signals from the receiving circuitry coupled to the capacitive touch panel. The receiving circuitry in this example includes a front-end electronics that is coupled to the capacitive touch panel, an ADC module and a digital mixer.

Figure 8:
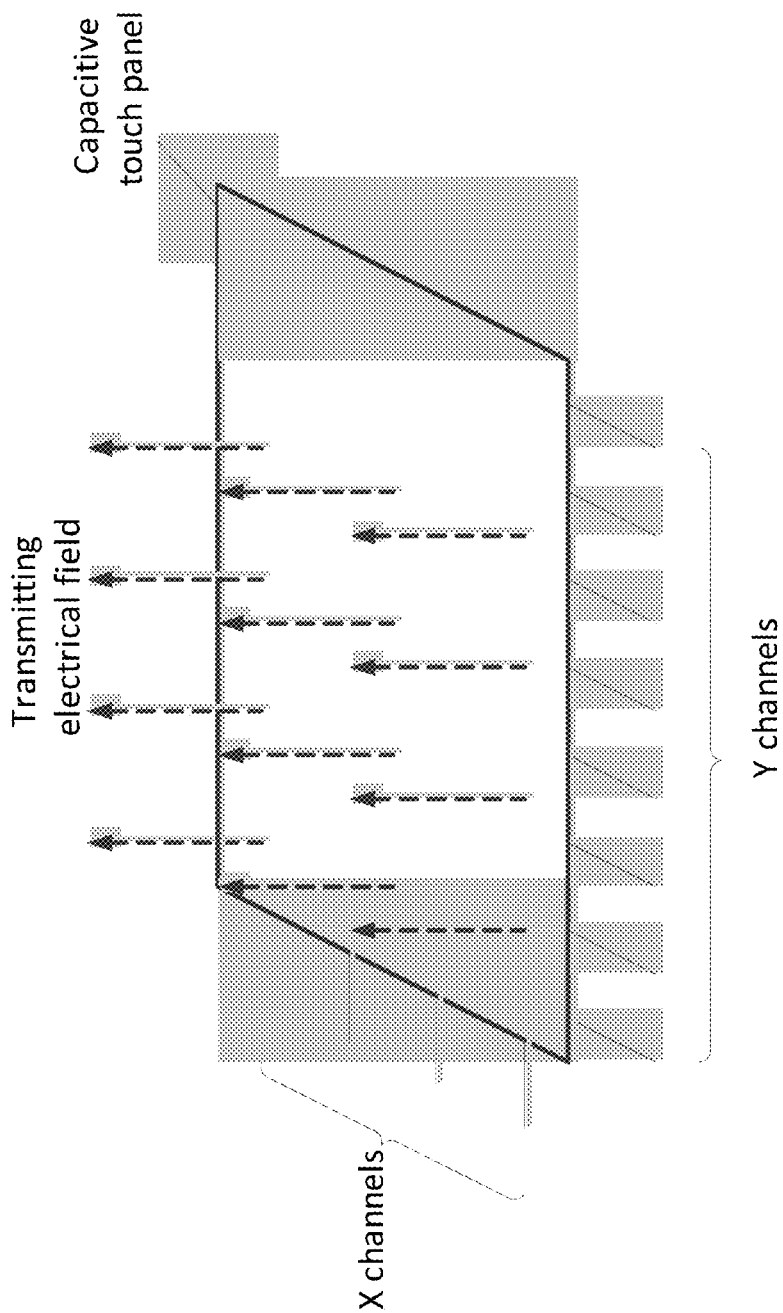
FIG. 8 shows an example of a capacitive touch panel with an array of capacitive pixels along x and y directions.

FIG. 8 shows an example of a capacitive touch panel with an array of capacitive pixels along x and y directions. As illustrated, this capacitive touch panel can transmit or receive signals through capacitive coupling via human body or direct device-to-device contact/coupling. When the capacitive touch panel is used for providing a display function of displaying information to a user, a touch panel user I/O interface for the user to operate and interact with the device, and a device-to-device communication interface for receiving and transmitting a device-to-device communication signal with another device, the signaling for these different functions can be achieved by assigning respective time slots in time division multiplexing.

Figure 9:
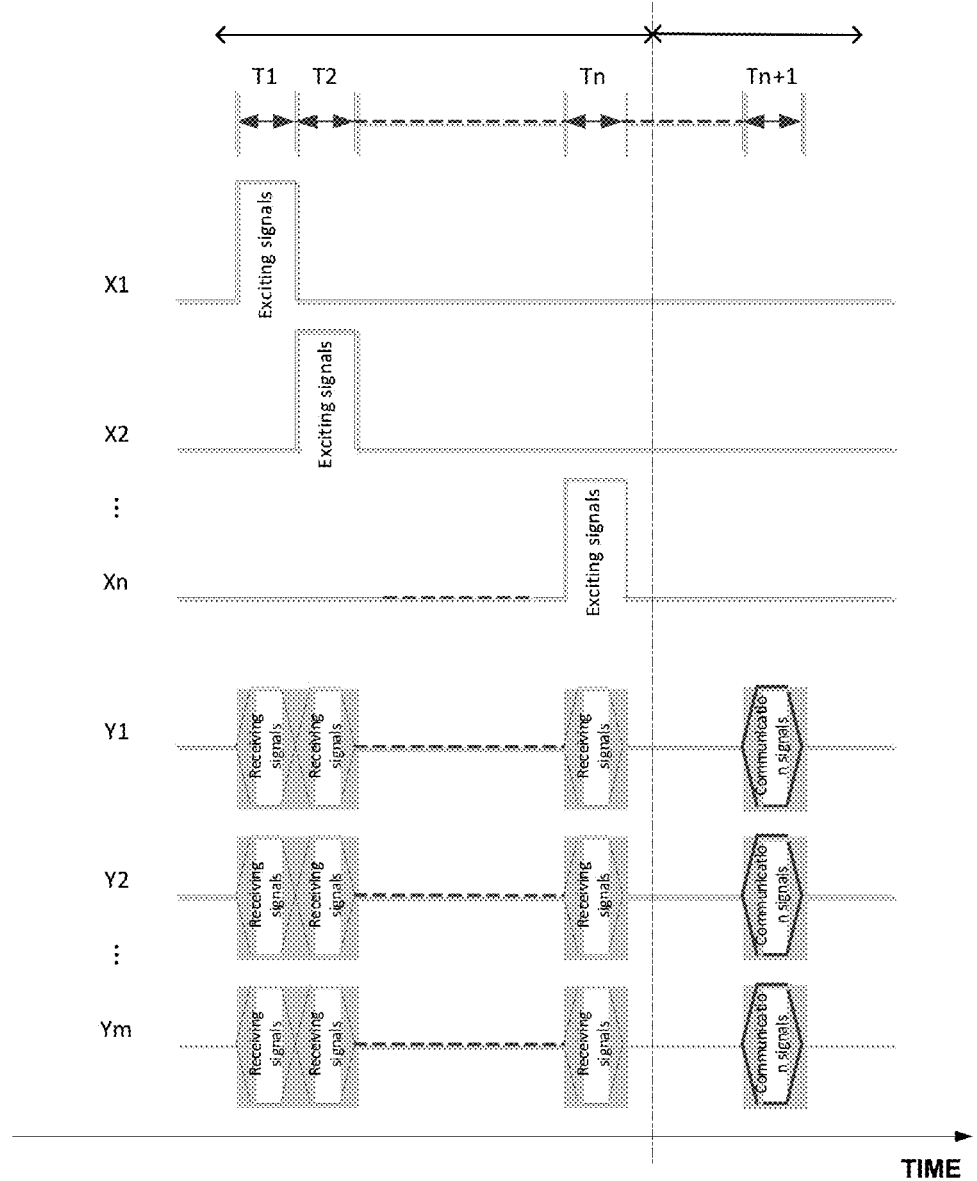
FIG. 9 shows an example of signaling for different touch panel functions based on assigning different messaging in different time slots in time division multiplexing for the capacitive touch panel in FIG. 8.

FIG. 9 shows an example of signaling for different touch panel functions based on assigning different messaging in different time slots in time division multiplexing for the capacitive touch panel in FIG. 8. The signaling is assigned with time slots for touch panel display and user I/O signaling (e.g., the first part of the signaling in time) and time slots for the device-to-device communication signaling (e.g., the second part of the signaling in time). Referring to the example in FIGS. 4 and 5, the signaling between the master device and the slave device is included in the later time slots for the device-to-device communication signaling in FIG. 9.

Figure 10:
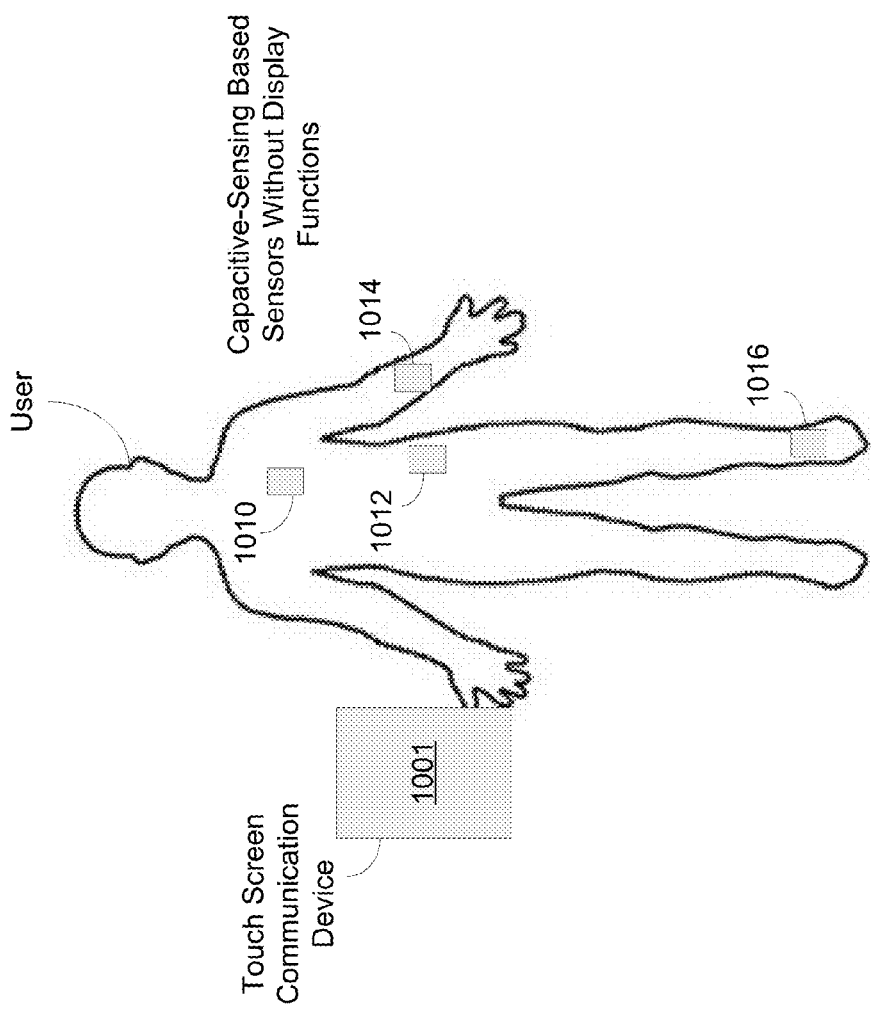
FIG. 10 shows an example of the application as shown in FIG. 6 where one touch screen communication device 1001 is linked to two or more capacitive-sensing based sensors 1010, 1012, 1014 and 1016 without display functions.

FIG. 10 shows an example of the application as shown in FIG. 6 where one touch screen communication device 1001 is linked to two or more capacitive-sensing based sensors 1010, 1012, 1014 and 1016 without display functions. The touch screen communication device 1001 can be a smart phone, a tablet or a portable computer where the touch panel screen serves the functions of displaying information to a user, a user I/O interface and a device-to-device capacitive-coupling based communication interface. The two or more capacitive-sensing based sensors 1010, 1012, 1014 and 1016 have capacitive sensors without display functions. For example, a capacitive-sensing based sensor 1010, 1012, 1014 or 1016 may also include a capacitive touch panel as the device-to-device capacitive-coupling based communication interface for the sensor but does not provide displaying function. The capacitive-sensing based sensors 1010, 1012, 1014 and 1016 can be attached to the user or be placed in proximity of the user to enable capacitive coupling between each sensor and the user's body for device-to-device communications with the device 1001.

A capacitive-sensing based sensor 1010, 1012, 1014 or 1016 in FIG. 10 may be located at a number of locations depending on the sensing needs. For example, a capacitive-sensing based sensor may be placed on a foot or in a shoe of the user such as the sensor 1016 for sensing a desired parameter (e.g., the movement of the foot). For another example, a capacitive-sensing based sensor may be placed near the waist of the user such as the sensor 1012 for sensing a desired parameter (e.g., attaching to the belt of the user). For another example, a capacitive-sensing based sensor may be placed on the forearm or wrist of the user such as the sensor 1014 for sensing a desired parameter (e.g., the blood pressure or movement of the hand or arm). For yet another example, a capacitive-sensing based sensor may be placed in the chest area of the user such as the sensor 1010 for sensing a desired parameter (e.g., the heart beat, the body temperature or the position or movement of the chest). Measurements from these sensors are communicated to the touch screen communication device 1001. The device 1001 can do local processing the received measurements from the sensors or may be linked to a server in the network cloud to direct the collected measurements to the server for further processing or storage.

Figure 11:
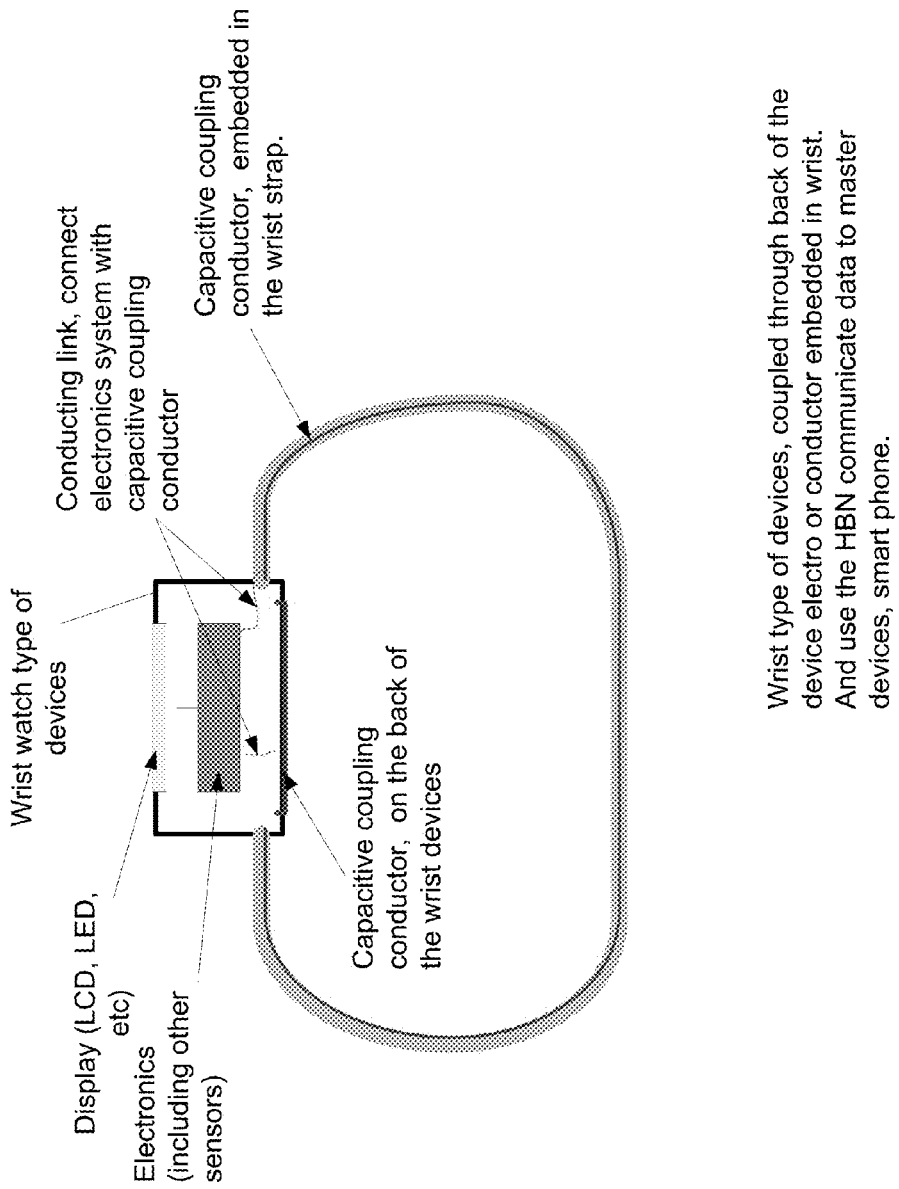
FIG. 11 shows an example a sensor device configured to be worn on a wrist of a user.

FIG. 11 shows an example a sensor device configured to be worn on a wrist of a user. In this example, the sensor device includes electronics, a backend capacitive coupling conductor for the device-to-device communications and a frontend display panel for displaying information to a user. The wrist strap is embedded with a capacitive coupling conductor that is electrically connected to the electronics which is electrically connected to the backend capacitive coupling conductor which is in contact with the wrist when the device is worn by the user. The electronics includes a sensor or a communication module to enable device-to-device communications via the backend capacitive coupling conductor based on capacitive coupling. This sensor device is an example of sensor devices having a backend capacitive coupling conductor which may include a single capacitor conductor or multiple capacitor conductors such as a touch panel for facing or contacting the wrist of the user to provide the capacitive coupling for the device-to-device communications. This sensor device may include a display panel on the front side for the user to view certain information but the display panel is a separate device from the backend single capacitor conductor or multiple capacitor conductors of a touch panel for the device-to-device capacitive coupling communications. The display panel on the front side can be implemented based on various display technologies, including but not limited to, CCD and LED displays.

Figure 12:
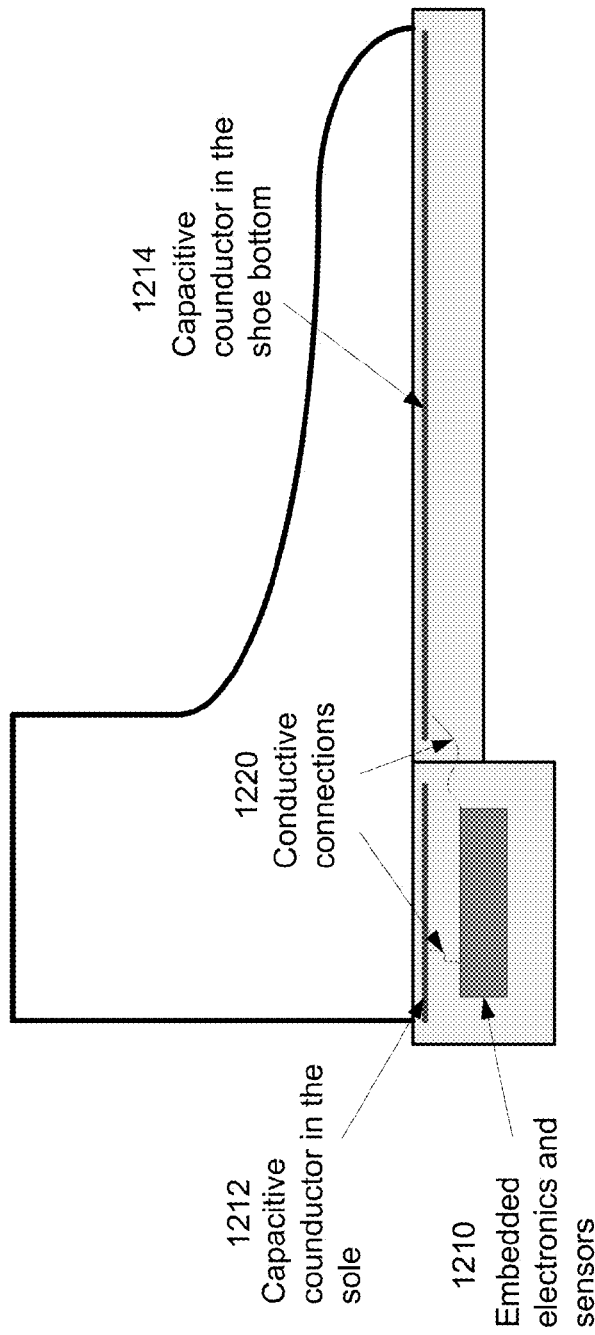
FIG. 12 shows an example a sensor device configured to be embedded in the sole of a shoe of a user.

FIG. 12 shows an example a sensor device configured to be embedded in the sole of a shoe of a user. In this example, a sensor device includes an electronic module 1210 that includes electronic circuitry and one or more sensors, and a capacitive conductor 1212 or 1214 that provides the capacitive coupling with the foot of the user for the device-to-device communications. A conductor connection 1220 is provided to connect the capacitive conductor 1212 or 1214 with the electronic module 1210. The capacitive conductors 1212 and 1214 represent two options for the capacitive coupling design. This sensor device is an example of sensors that do not normally have a display panel such as LCD, LED or other display devices for displaying information to the user.

Figure 13:
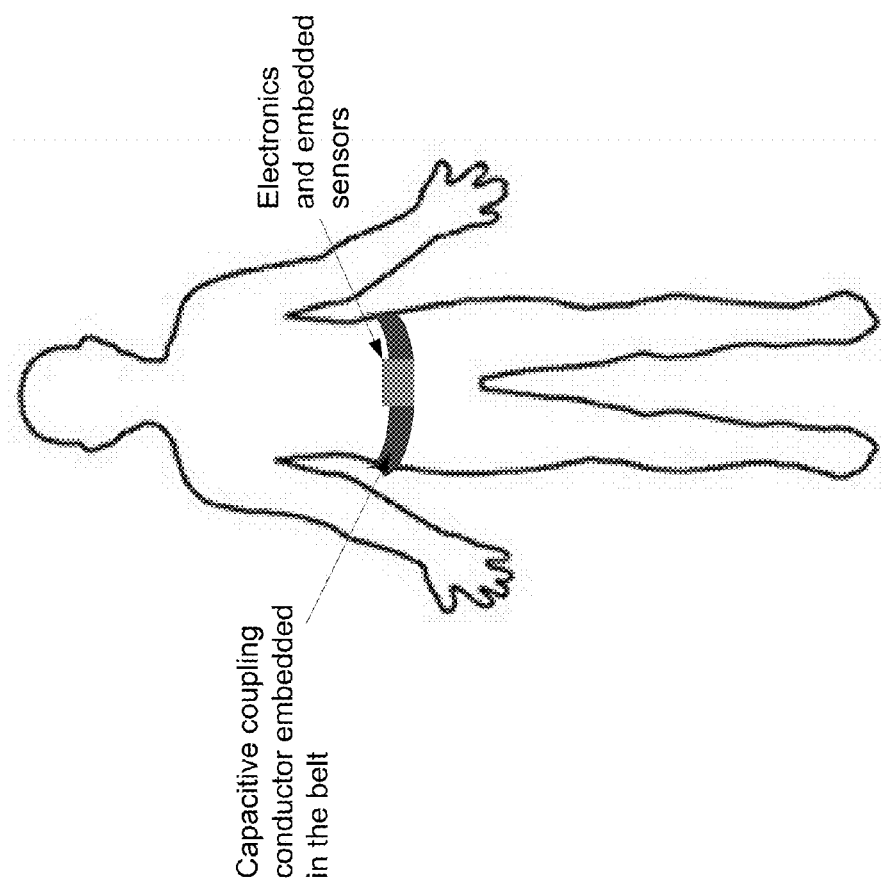
FIG. 13 further shows an example of a capacitive sensor device designed to be worn on a belt of a user.

FIG. 13 further shows an example of a capacitive sensor device designed to be worn on a belt of a user. Similar to the design in FIG. 11, the belt has an embedded conductor for the capacitive coupling circuit and the device has a backend capacitive coupling conductor that faces the user body to enable device-to-device capacitive coupling communications via the user body. Also similar to the design in FIG. 11, this sensor device may include a display panel on the front side for the user to view certain information but the display panel is a separate device from the backend single capacitor conductor or multiple capacitor conductors of a touch panel for the device-to-device capacitive coupling communications.

Figure 14A:
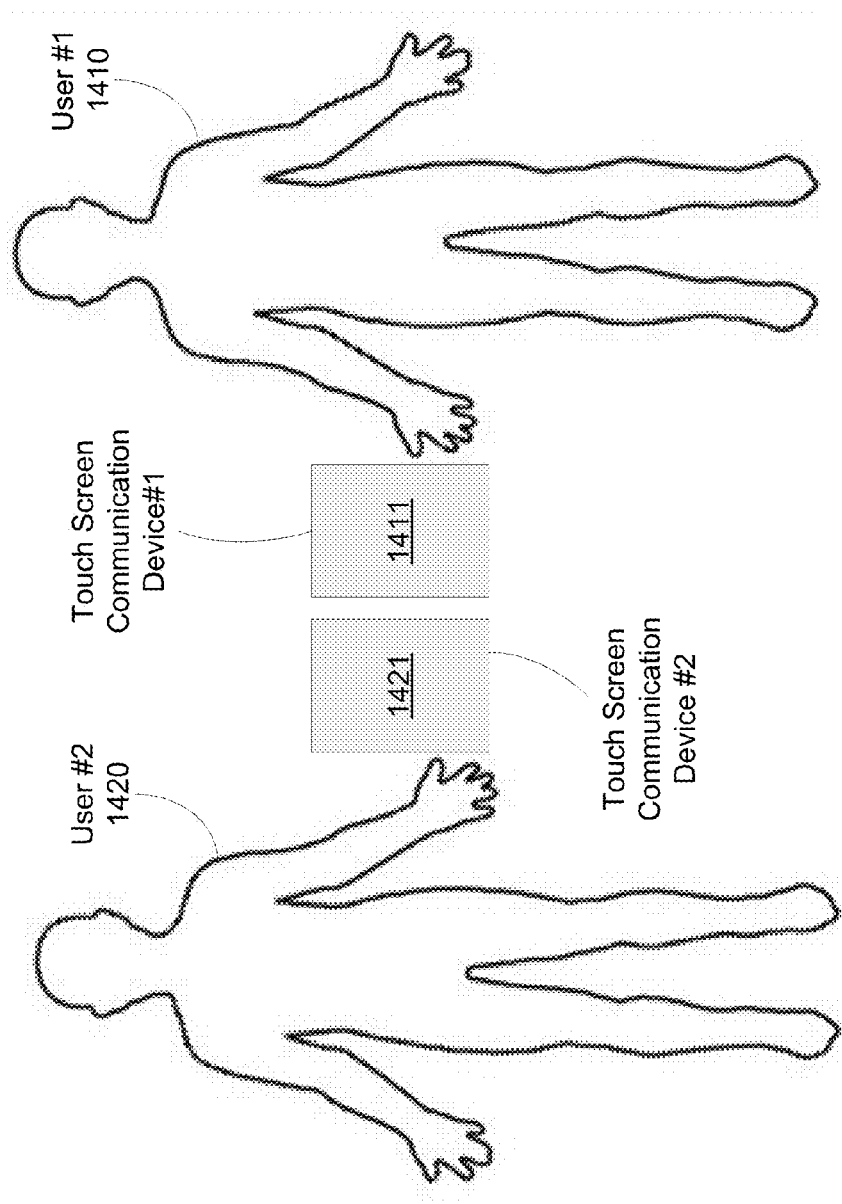
FIG. 14A shows an example of a direct capacitive coupling between two smart phones or tablets 1411 and 1421 that are held to be either close to each other or in direct contact with each other to enable the capacitive coupling between their respective touch panels for device-to-device communications.
Figure 14B:
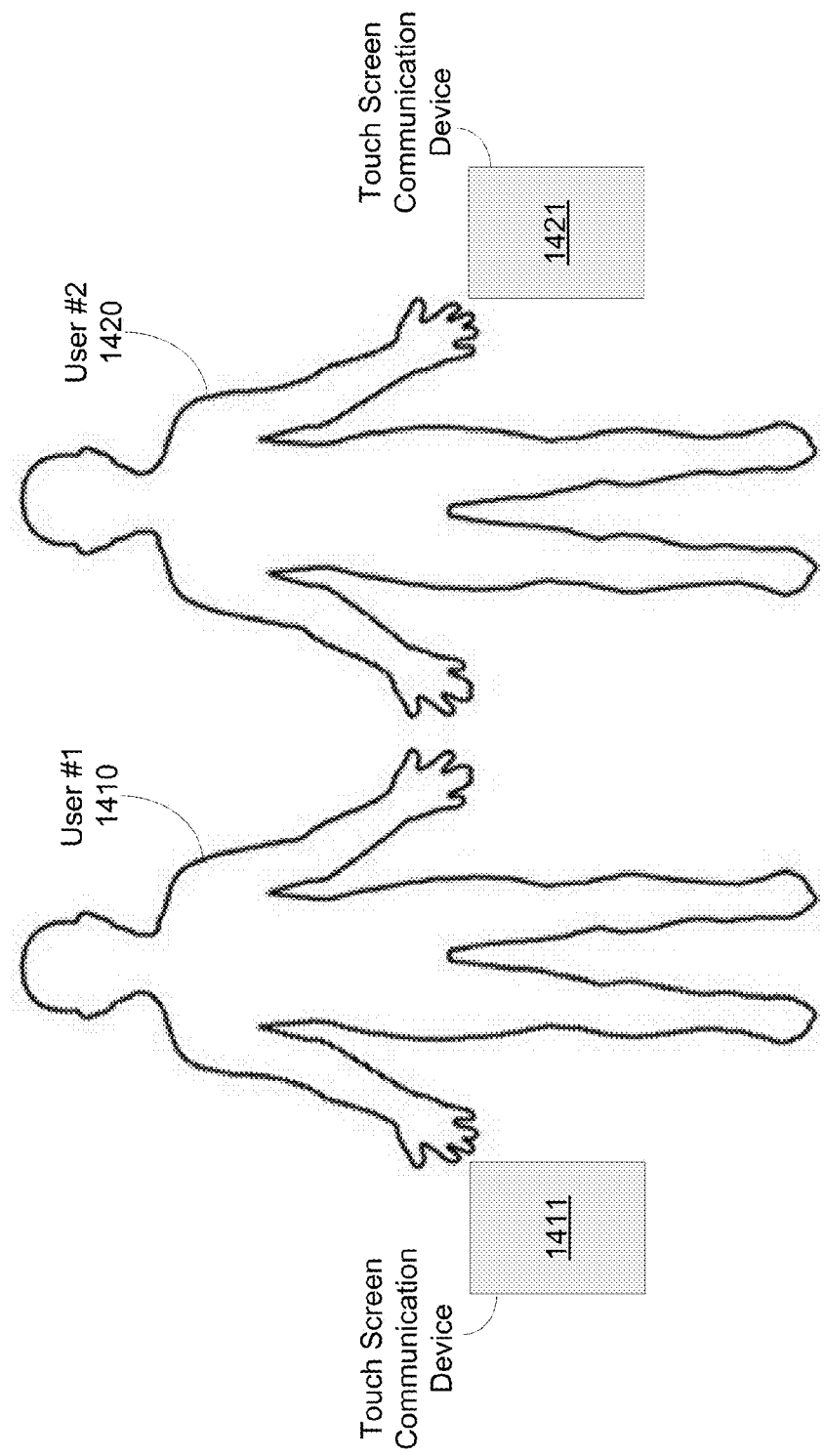
FIG. 14B shows an example of an indirect capacitive coupling between two smart phones or tablets 1411 and 1421 that are held by two persons 1410 and 1420, respectively.

The above disclosed device-to-device capacitive coupling communications may be implemented to enable two smart phones or tablets with touch panels to communicate with each other based on device-to-device capacitive coupling communications via their touch panels. This device-to-device capacitive coupling communications can provide an alternative or additional communication means to some existing device-to-device communication channels (e.g., RF device to device communications under the Bluetooth and IR device to device communications). In some implementations, the ad hoc communication protocol in FIGS. 3, 4 and 5 and the time division multiplexing (TDM) signaling shown in FIG. 9 can be used to enable such communications. FIGS. 14A and 14B illustrate two exemplary modes of operation for this smart phone to smart phone communications.

FIG. 14A shows an example of a direct capacitive coupling between two smart phones or tablets 1411 and 1421 that are held to be either close to each other or in direct contact with each other to enable the capacitive coupling between their respective touch panels for device-to-device communications. The two smart phones or tablets 1411 and 1421 can held by one person or two persons 1410 and 1420 as shown in FIG. 14A to be sufficiently close or in contact to enable the capacitive coupling between their respective touch panels. Upon completion of the ad hoc communication protocol in FIGS. 3, 4 and 5, the two smart phones or tablets 1411 and 1421 can exchange data.

FIG. 14B shows an example of an indirect capacitive coupling between two smart phones or tablets 1411 and 1421 that are held by two persons 1410 and 1420, respectively. The two persons 1410 and 1420 contact each other to provide the capacitive coupling via the two user bodies between the two smart phones or tablets 1411 and 1421. Upon completion of the ad hoc communication protocol in FIGS. 3, 4 and 5, the two smart phones or tablets 1411 and 1421 can exchange data.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Only a few embodiments are described. Other embodiments and their variations and enhancements can be made based on what is described and illustrated.

What is claimed is what is described and illustrated, including:

1. A device for device-to-device communication through capacitive coupling, the device including:
   a capacitive sensing touch screen having capacitive sensors to establish a capacitive coupled device-to-device communication with another device having at least one capacitive sensor including:
      transmitting an initiation signal to initiate the capacitive coupled device-to-device communication with the other device having at least one capacitive sensor, wherein the initiation signal is multiplexed in time with a touch screen signal associated with a touch-based interface through the capacitive sensing touch screen, and wherein the initiation signal is transmitted to the other device having at least one capacitive sensor using capacitive coupling between the capacitive sensors of the capacitive sensing touch screen in the device and the at least one capacitive sensor of the other device;
      receiving an acknowledgement to the transmitted initiation signal, the acknowledgement received from the other device that includes at least one capacitive sensor; and
      communicating through the established capacitive coupled device-to-device communication between the device that includes the capacitive sensing touch screen having capacitive sensors and the other device that includes at least one capacitive sensor, the communicating including:
         transmitting a device-to-device communication signal to the other device that includes at least one capacitive sensor, wherein the device-to-device communication signal is multiplexed in time with the touch screen signal associated with a touch-based interface through the capacitive sensing touch screen.

2. The device of claim 1, wherein the capacitive coupling between the capacitive sensors of the capacitive sensing touch screen in the device and the at least one capacitive sensor of the other device includes capacitive coupling through a user.

3. The device of claim 1, including:
   detecting, by the device that includes the capacitive sensing touch screen having capacitive sensors, a touch on the capacitive sensing touch panel and generates the touch signal responsive to the detected touch.

4. The device of claim 1, wherein establishing the capacitive coupled device-to-device communication includes:
   responsive to the received acknowledgement, transmitting from the device that includes the capacitive sensing touch screen, an acknowledgment back signal to the other device that includes at least one capacitive sensor.

5. The device of claim 1, wherein:
   the device that includes the capacitive sensing touch screen includes a mobile device.

6. The device of claim 5, wherein:
   the mobile device includes a smartphone or a tablet.

7. The device as in claim 1, wherein the device is configured to perform operations including:
   modulating information for device-to-device communication based on a frequency modulation protocol for device-to-device signaling between the device that includes the capacitive sensing touch screen and the other device that includes at least one capacitive sensor via capacitive coupling through a user.

8. A device for device-to-device communication through capacitive coupling, the device including:
   at least one capacitive sensor to establish a capacitive coupled device-to-device communication with another device that includes a capacitive sensing touch screen having capacitive sensors including:
      receiving an initiation signal from the other device that includes the capacitive sensing touch screen having capacitive sensors to initiate the capacitive coupled device-to-device communication, wherein the initiation signal is received from the other device that includes the capacitive sensing touch screen using capacitive coupling between the at least one capacitive sensor of the device and the capacitive sensors of the capacitive sensing touch screen in the other device;
      transmitting an acknowledgement to the received initiation signal, the acknowledgement transmitted to the other device that includes the capacitive sensing touch screen; and
      communicating through the established capacitive coupled device-to-device communication with the other device that includes the capacitive sensing touch screen having capacitive sensors including:
         transmitting a device-to-device communication signal to the other device that includes the capacitive sensing touch screen having capacitive sensors.

9. The device of claim 8, wherein the device is configured to establish capacitive coupling with the capacitive sensors of the capacitive sensing touch screen in the other device using capacitive coupling through a user.

10. The device of claim 8, wherein the device is configured to establish the capacitive coupled device-to-device communication including:
    responsive to the transmitted acknowledgement, receiving an acknowledgement response signal from the other device that includes the capacitive sensing touch screen.

11. The device of claim 8, wherein:
    the device that includes at least one capacitive sensor includes a wearable device.

12. The device of claim 11, wherein:
    the wearable device includes a smartwatch.

13. The device of claim 8, wherein:
    the device that includes at least one capacitive sensor includes a capacitive touch screen.

14. The device of claim 8, wherein the device is configured to communicate through the established capacitive coupled device-to-device communication including:
    transmitting sensor data to the device that includes the capacitive sensing touch screen.

15. The device of claim 14, wherein:
    the transmitted sensor data includes a biological parameter of a user.

16. The device of claim 15, wherein:
    the biological parameter of the user includes at least one of a temperature, blood pressure, or a pulse rate.

17. The device of claim 14, wherein:
    the transmitted sensor data includes a motion parameter of the user.

* * * * *